No. 701,503. Patented June 3, 1902.
B. I. PLUMMER.
BUTCHER'S BLOCK SCRAPER.
(Application filed Jan. 29, 1902.)
(No Model.)

Witnesses
T. P. Britt
Harry Ellis Chandler

Inventor
B. I. Plummer;
By Chandler & Chandler
Attorneys

UNITED STATES PATENT OFFICE.

BEECHER I. PLUMMER, OF GRANTS PASS, OREGON.

BUTCHER'S BLOCK-SCRAPER.

SPECIFICATION forming part of Letters Patent No. 701,503, dated June 3, 1902.

Application filed January 29, 1902. Serial No. 91,792. (No model.)

*To all whom it may concern:*

Be it known that I, BEECHER I. PLUMMER, a citizen of the United States, residing at Grants Pass, in the county of Josephine, State of Oregon, have invented certain new and useful Improvements in Butchers' Block-Scrapers; and I do hereby declare the following to be a full, clear, and exact description of the invention, such as will enable others skilled in the art to which it appertains to make and use the same.

This invention relates to scrapers for butchers' blocks; and it has for its object to provide a scraper having two scraping edges so arranged as to permit of easy sharpening of both edges simultaneously, a further object of the invention being to provide a fixed handle and a movable handle, the latter being so arranged and secured as to permit of reversal thereof when the scraping edges are reversely brought into active positions.

Figure 1:
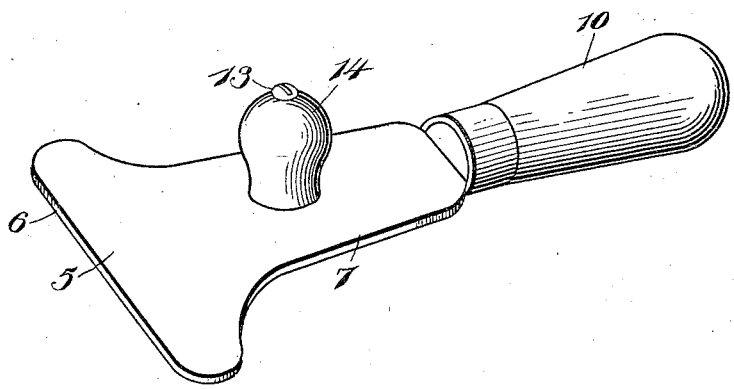
Figure 2:
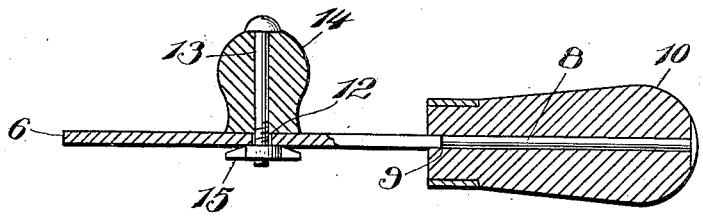
Figure 3:

In the drawings forming a portion of this specification, and in which like numerals of reference indicate similar parts in the several views, Figure 1 is a perspective view showing the complete scraper. Fig. 2 is a central longitudinal section through the scraper and showing the arrangement which permits of reversal of the position of the second handle. Fig. 3 is a longitudinal section through a portion of a blade and showing a modification.

Referring now to the drawings, it will be seen that the present scraper comprises a blade including the broadened end portion 5, having a straight front edge 6, which is flat and is at right angles to the upper and lower faces of the blade. In the rear of the scraping edges the blade is reduced transversely, as shown at 7, to form an intermediate portion of lesser width, and the rear end thereof is again reduced to form the stem 8 and the shoulder 9. A handle 10 is provided, having a central longitudinal passage therethrough which receives the stem, the free end of which latter is upset, as shown. The front end of the handle bears against the shoulder 9 and is notched to receive the shoulder, as shown. In the central portion 7 of the blade is a perforation 12 to receive the bolt 13 of a supplemental handle 14, the bolt being passed through the handle and having a thumb-nut 15 engaged with its end to clamp the handle in place. By loosening the nut and removing it from the bolt the supplemental handle may be engaged at the opposite side of the blade, as will be understood. With this construction the scraper is pushed from the operator instead of being drawn toward him in the usual manner. The flat end of the scraper may of course be of any thickness and, if desired, may be of greater thickness than the body of the blade, the blade tapering or decreasing in thickness in the direction of the handle.

What is claimed is—

1. A block-scraper comprising a blade having scraping edges at one end thereof, a handle fixed to the opposite end of the blade, and a handle removably engaged with the blade at a point between the scraping edges and the fixed handle, said blade and second handle being constructed to permit of engagement of the handle at opposite sides of the blade.

2. A block-scraper comprising a blade having scraping edges at one end thereof and having a handle fixed at its opposite end, said blade having a perforation therethrough intermediate of the handle and scraping edges, and a supplemental handle having a bolt passed therethrough and engaged with the perforation, said bolt having a clamping thumb-nut engaged removably therewith, whereby the supplemental handle may be engaged at either side of the blade.

In testimony whereof I affix my signature in presence of two witnesses.

BEECHER I. PLUMMER.

Witnesses:
ABE AXTELL,
PHEBE AXTELL.